US012199855B2

(12) United States Patent
Lin et al.

(10) Patent No.: US 12,199,855 B2
(45) Date of Patent: Jan. 14, 2025

(54) MULTICAST FORWARDING ENTRY GENERATION METHOD AND ACCESS GATEWAY

(71) Applicant: HUAWEI TECHNOLOGIES CO., LTD., Shenzhen (CN)

(72) Inventors: Zhongfang Lin, Shenzhen (CN); Wenbin Ju, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 460 days.

(21) Appl. No.: 17/558,935

(22) Filed: Dec. 22, 2021

(65) Prior Publication Data

US 2022/0116309 A1 Apr. 14, 2022

Related U.S. Application Data

(63) Continuation of application No. PCT/CN2020/097241, filed on Jun. 19, 2020.

(30) Foreign Application Priority Data

Jun. 25, 2019 (CN) .......................... 201910554586.9

(51) Int. Cl.
*H04L 45/16* (2022.01)
*H04L 12/18* (2006.01)
(Continued)

(52) U.S. Cl.
CPC .............. *H04L 45/16* (2013.01); *H04L 12/18* (2013.01); *H04L 12/4675* (2013.01); *H04L 45/02* (2013.01)

(58) Field of Classification Search
CPC ..... H04L 45/16; H04L 12/18; H04L 12/4675; H04L 45/02; H04L 12/46; H04L 12/4633;
(Continued)

(56) References Cited

U.S. PATENT DOCUMENTS 8,320,290 B2 * 11/2012 Chao ....................... H04W 4/06
370/312
10,033,539 B1 7/2018 Nagarajan et al.
(Continued)

FOREIGN PATENT DOCUMENTS

CN 101094175 A 12/2007
CN 101145930 A 3/2008
(Continued)

OTHER PUBLICATIONS

Yin Min et al., "An Improved ODMRP Used for Multi-Source Group Communication", Journal of Beijing University of Posts and Telecommunications, vol. 32 No. 5, Oct. 2009, with an English abstract, total 5 pages.

(Continued)

Primary Examiner — Luat Phung
(74) Attorney, Agent, or Firm — HAUPTMAN HAM, LLP

(57) ABSTRACT

A multicast forwarding entry generation method includes receiving a first multicast packet from a first border gateway. The method also includes generating a first multicast forwarding entry based on the first multicast packet. The first multicast forwarding entry includes an address of the first border gateway and information about a multicast source. The method further includes receiving a second multicast packet from a second border gateway. The second multicast packet includes an address of the second border gateway and the information about the multicast source. The method additionally includes determining a first path to the multicast source through the first border gateway and a second path to the multicast source through the second border gateway. The method also includes determining an optimal path to the multicast source based on the first path and the second path, (Continued)

and generating a forwarding entry of the multicast source based on the optimal path.

20 Claims, 6 Drawing Sheets

(51) Int. Cl.
*H04L 12/46* (2006.01)
*H04L 45/02* (2022.01)

(58) Field of Classification Search
CPC . H04L 2212/00; H04L 12/462; H04L 45/033; H04L 45/64; H04L 45/66; H04L 49/201; H04L 49/354; H04L 2012/4629; H04L 12/4641; H04L 45/123; H04L 45/74
See application file for complete search history.

(56) References Cited

U.S. PATENT DOCUMENTS

| | | | |
|---|---|---|---|
| 2003/0005149 A1* | 1/2003 | Haas | H04L 45/28 709/238 |
| 2009/0245248 A1* | 10/2009 | Arberg | H04L 12/185 370/390 |
| 2010/0265866 A1* | 10/2010 | Chao | H04W 72/30 370/312 |
| 2016/0142284 A1 | 5/2016 | Ma | |

FOREIGN PATENT DOCUMENTS

| | | |
|---|---|---|
| CN | 101656679 A | 2/2010 |
| CN | 101789874 A | 7/2010 |
| CN | 102316016 A | 1/2012 |
| CN | 102694664 A | 9/2012 |
| CN | 102932248 A | 2/2013 |
| CN | 103067865 A | 4/2013 |
| CN | 104901893 A | 9/2015 |
| CN | 107147576 A | 9/2017 |
| CN | 107566262 A | 1/2018 |
| CN | 108900422 A | 11/2018 |
| CN | 109218187 A | 1/2019 |
| CN | 109474520 A | 3/2019 |
| EP | 3292659 B1 | 4/2020 |
| IN | 105099725 A | 11/2015 |
| IN | 109743250 A | 5/2019 |
| JP | 2005094137 A | 4/2005 |
| WO | 2013053334 A1 | 4/2013 |
| WO | 2016116939 A1 | 7/2016 |
| WO | 2018158615 A1 | 9/2018 |

OTHER PUBLICATIONS

Chinese Notice of Allowance issued in corresponding Chinese Application No. 201910554586.9, dated Jun. 6, 2022, pp. 1-5.
Extended European Search Report issued in corresponding European Application No. 20832715.5, dated Jun. 9, 2022, pp. 1-8.
India Examination Report issued in corresponding India Application No. 202127055591, dated May 12, 2022, pp. 1-5.
Kyoomars Alizadeh Noghani et al., "SDN Enhanced Ethernet VPN for Data Center Interconnect",arXiv:1911.00779v1 [cs.NI] Nov. 2, 2019,total 6 pages.
International Search Report issued in corresponding International Application No. PCT/CN2020/097241, dated Sep. 23, 2020, pp. 1-9.
Chinese Office Action issued in corresponding Chinese Application No. 201910554586.9, dated Nov. 19, 2021, pp. 1-8.

* cited by examiner

200

| An access gateway receives a first multicast packet from a first border gateway, and generates a first multicast forwarding entry based on the first multicast packet, where the first multicast forwarding entry includes an address of the first border gateway and information about a multicast source | ～ 210 |

| The access gateway receives a second multicast packet from a second border gateway, where the second multicast packet includes an address of the second border gateway and the information about the multicast source | ～ 220 |

| The access gateway determines a first path that is to the multicast source and that is through the first border gateway, and a second path that is to the multicast source and that is through the second border gateway | ～ 230 |

| The access gateway determines an optimal path to the multicast source based on the first path and the second path | ～ 240 |

| The access gateway generates a forwarding entry of the multicast source based on the optimal path | ～ 250 |

FIG. 2

MULTICAST FORWARDING ENTRY GENERATION METHOD AND ACCESS GATEWAY

CROSS-REFERENCE TO RELATED APPLICATIONS

This application is a continuation of International Application No. PCT/CN2020/097241, filed on Jun. 19, 2020, which claims priority to Chinese Patent Application No. 201910554586.9, filed on Jun. 25, 2019. The disclosures of the aforementioned applications are hereby incorporated by reference in their entireties.

TECHNICAL FIELD

This application relates to the communication field, and to a multicast forwarding entry generation method and an access gateway.

BACKGROUND

Currently, a data center is developing in a direction of large-scale development, virtualization, and cloud computing. In addition, to adapt to a larger traffic volume and reduce maintenance costs, the data center gradually evolves to a large layer 2 technology and virtualization. As one of Network Virtualization over Layer 3 (NVO3) technologies, a virtual extensible local area network (VXLAN) technology has quite strong adaptability, and provides a good solution for the data center.

The VXLAN technology uses an existing physical network as an underlay network, and constructs a virtual layer 2 or layer 3 network, that is, an overlay network, on the existing physical network. The overlay network implements transmission of a user packet between different sites by using an encapsulation technology and a layer 3 forwarding path provided by the underlay network.

To improve reliability in a VXLAN network, a tenant usually deploys a plurality of border gateways for backup and load balancing, to ensure that a flow can be switched to another border gateway in a timely manner when one border gateway is faulty, to avoid service interruption. Different VXLAN tunnel end point (VTEP) Internet Protocol (IP) addresses are set for the plurality of border gateways on the VXLAN network. When a multicast user orders a multicast program, all the plurality of border gateways can forward a multicast packet sent by a multicast source. As a result, a plurality of copies of a same multicast packet are transmitted on the VXLAN network, and an access gateway receives and forwards the plurality of copies of the same multicast packet to the multicast user, causing a waste of network resources.

SUMMARY

This application provides a multicast forwarding entry generation method and an access gateway, to improve bandwidth resource utilization of a VXLAN network and a processing capability of the access gateway, and avoid a problem that a multicast user receives an excess-packet flow.

According to a first aspect, a multicast forwarding entry generation method is provided, applied to a network including an access gateway, a first border gateway, and a second border gateway, where the first border gateway and the second border gateway correspond to a same multicast source. The access gateway receives a first multicast packet from the first border gateway, and generates a first multicast forwarding entry based on the first multicast packet, where the first multicast forwarding entry includes an address of the first border gateway and information about the multicast source. The access gateway receives a second multicast packet from the second border gateway, where the second multicast packet includes an address of the second border gateway and the information about the multicast source, and the second multicast packet and the first multicast packet correspond to the same multicast source. The access gateway determines a first path to the multicast source through the first border gateway, and a second path to the multicast source through the second border gateway. The access gateway determines an optimal path to the multicast source based on the first path and the second path. The access gateway generates a forwarding entry of the multicast source based on the optimal path.

After receiving the first multicast packet from the first border gateway, the access gateway generates the first multicast forwarding entry corresponding to the first multicast packet, where the first multicast forwarding entry includes the address of the first border gateway and the information about the multicast source. The access gateway receives the second multicast packet from the second border gateway, where the second multicast packet includes the address of the second border gateway and the information about the multicast source. The first border gateway and the second border gateway correspond to the same multicast source. In other words, the first multicast packet and the second multicast packet are from the same multicast source. In addition, the information about the multicast source in the second multicast packet is consistent with the corresponding information about the multicast source in the first multicast forwarding entry. Therefore, the access gateway determines the first path to the multicast source through the first border gateway, that is, a path through which the multicast source forwards the first multicast packet to the access gateway through the first border gateway. The access gateway further determines the second path to the multicast source through the second border gateway, that is, a path through which the multicast source forwards the second multicast packet to the access gateway through the second border gateway. Then, the access gateway determines the optimal path from the access gateway to the multicast source based on the first path and the second path. The access gateway generates the forwarding entry of the multicast source based on the optimal path, so that the access gateway performs multicast packet forwarding based on the forwarding entry of the multicast source, and forwards only a multicast packet that is received through the optimal path. This prevents a multicast user from receiving a plurality of copies of a same multicast packet, and improves bandwidth resource utilization of a VXLAN network.

With reference to the first aspect, in a possible implementation, that the access gateway generates a forwarding entry of the multicast source based on the optimal path includes: when the first path is the optimal path, using the first multicast forwarding entry as the forwarding entry of the multicast source; or when the second path is the optimal path, updating the first multicast forwarding entry based on information about the second border gateway, to obtain a second multicast forwarding entry, and using the second multicast forwarding entry as the forwarding entry of the multicast source, where the second multicast forwarding entry includes the address of the second border gateway and the information about the multicast source.

The information about the second border gateway is used to indicate the address of the second border gateway. The information about the multicast source may include an identifier of a multicast group and/or an identifier of the multicast source, where the identifier of the multicast group may be used to indicate an address of the multicast group, and the identifier of the multicast source may be used to indicate an address of the multicast source.

When the first path is the optimal path, the forwarding entry of the multicast source is the first multicast forwarding entry. When the second path is the optimal path, the access gateway needs to update the first multicast forwarding entry based on the information about the second border gateway, in other words, the access gateway updates the first multicast forwarding entry by using the information about the second border gateway through which the forwarded second multicast packet passes, to obtain the second multicast forwarding entry, and uses the second multicast forwarding entry as the forwarding entry of the multicast source. When a multicast packet forwarded from the same multicast source arrives at the access gateway, the access gateway updates, by using the information about the second border gateway carried in the multicast packet through the optimal path, the multicast forwarding entry that is in the access gateway, thereby improving bandwidth resource utilization of the VXLAN network.

With reference to the first aspect, in a possible implementation, when the first path is the optimal path, the method further includes: The access gateway discards the second multicast packet, and the access gateway sends a notification message to the second border gateway, where the notification message is used to indicate the second border gateway to stop forwarding a multicast packet of the multicast source to the access gateway.

When the first path is the optimal path, the access gateway discards the second multicast packet received by the access gateway, and indicates the second border gateway to stop forwarding a multicast packet of the multicast source to the access gateway, thereby improving a processing capability of the access gateway, and preventing the access gateway from forwarding a plurality of copies of a multicast packet to the multicast user.

With reference to the first aspect, in a possible implementation, when the second path is the optimal path, the method further includes: The access gateway sends a notification message to the first border gateway, where the notification message is used to indicate the first border gateway to stop forwarding a multicast packet of the multicast source to the access gateway.

When the second path is the optimal path, the access gateway indicates the first border gateway to stop forwarding a multicast packet of the multicast source to the access gateway, thereby preventing the access gateway from receiving multicast packets from a plurality of border gateways, and improving bandwidth resource utilization of the VXLAN network and the processing capability of the access gateway.

With reference to the first aspect, in a possible implementation, that the access gateway determines an optimal path to the multicast source based on the first path and the second path includes: The access gateway obtains the address of the first border gateway and the address of the second border gateway, and the access gateway determines the optimal path by comparing the address of the first border gateway with the address of the second border gateway.

The access gateway determines, based on the address of the first border gateway and the address of the second border gateway, the optimal path from the first path that passes through the first border gateway and the second path that passes through the second border gateway, thereby facilitating subsequent determining of the forwarding entry of the multicast source based on the optimal path, and improving bandwidth resource utilization of the VXLAN network.

According to a second aspect, an access gateway is provided. A network in which the access gateway is located further includes a first border gateway and a second border gateway, where the first border gateway and the second border gateway correspond to a same multicast source. The access gateway includes functional modules configured to implement the method in the first aspect and the implementations of the first aspect. The functional modules may be implemented in a manner of hardware, software, or a combination of hardware and software.

According to a third aspect, a network system is provided, including the access gateway according to the second aspect and at least two border gateways.

According to a fourth aspect, a computer program product is provided. The computer program product includes computer program code. When the computer program code is run by a network device, the network device is enabled to perform the method according to any one of the first aspect and the possible implementations of the first aspect.

It should be noted that all or part of the computer program code may be stored in a first storage medium. The first storage medium may be packaged with a processor, or may be packaged separately from a processor. This is not specifically limited in this embodiment of this application.

According to a fifth aspect, a computer readable medium is provided. The computer readable medium stores program code, and the program code is used to perform the method according to any one of the first aspect and the possible implementations of the first aspect.

According to a sixth aspect, a chip system is provided, configured to implement a function in the method according to any one of the first aspect or the possible implementations of the first aspect, for example, generating, receiving, sending, or processing data and/or information in the method. In a possible design, the chip system further includes a memory, where the memory is configured to store program instructions and data that are necessary for the access gateway. The chip system may include a chip, or may include a chip and another discrete device.

BRIEF DESCRIPTION OF DRAWINGS

FIG. 2 is a schematic flowchart of a multicast forwarding entry generation method according to an embodiment of this application;

DESCRIPTION OF EMBODIMENTS

For ease of understanding the embodiments of this application, the following several points are provided before the embodiments of this application are described.

First, in the embodiments of this application, an "indication" may include a direct indication and an indirect indication, or may include an explicit indication and an implicit indication. Information indicated by a piece of information is referred to as to-be-indicated information. The to-be-indicated information may be indicated in many manners, for example but not limited to: directly indicating the to-be-indicated information, for example, the to-be-indicated information or an index of the to-be-indicated information; indirectly indicating the to-be-indicated information by indicating other information, where there is an association relationship between the other information and the to-be-indicated information; or indicating only a part of the to-be-indicated information, where another part of the to-be-indicated information is known or agreed upon in advance. For example, particular information may be alternatively indicated by using a pre-agreed-upon (for example, a protocol stipulation) arrangement order of pieces of information, thereby reducing indication overheads to some extent.

Second, in the embodiments shown below, "first", "second", and various numerical numbers are used merely for distinguishing for ease of description, and are not intended to limit the scope of the embodiments of this application, for example, for distinguishing between different packets.

Third, "protocol" in the embodiments of this application may be a standard protocol in the communication field, for example, including an LTE protocol, an NR protocol, and a related protocol applied to a future communication system. This is not limited in this application.

Fourth, "a plurality of" in the embodiments of this application refers to two or more than two. "One or more of the following items" or a similar expression thereof indicates any combination of these items, including a single item or any combination of a plurality of items. For example, "at least one or more of a, b, and c" may indicate a, b, c, "a and b", "a and c", "b and c", or "a, b, and c", where a, b, and c may be singular or plural. The following describes in detail the method provided in the embodiments of this application with reference to the accompanying drawings.

The following describes technical solutions of this application with reference to the accompanying drawings.

Figure 1:
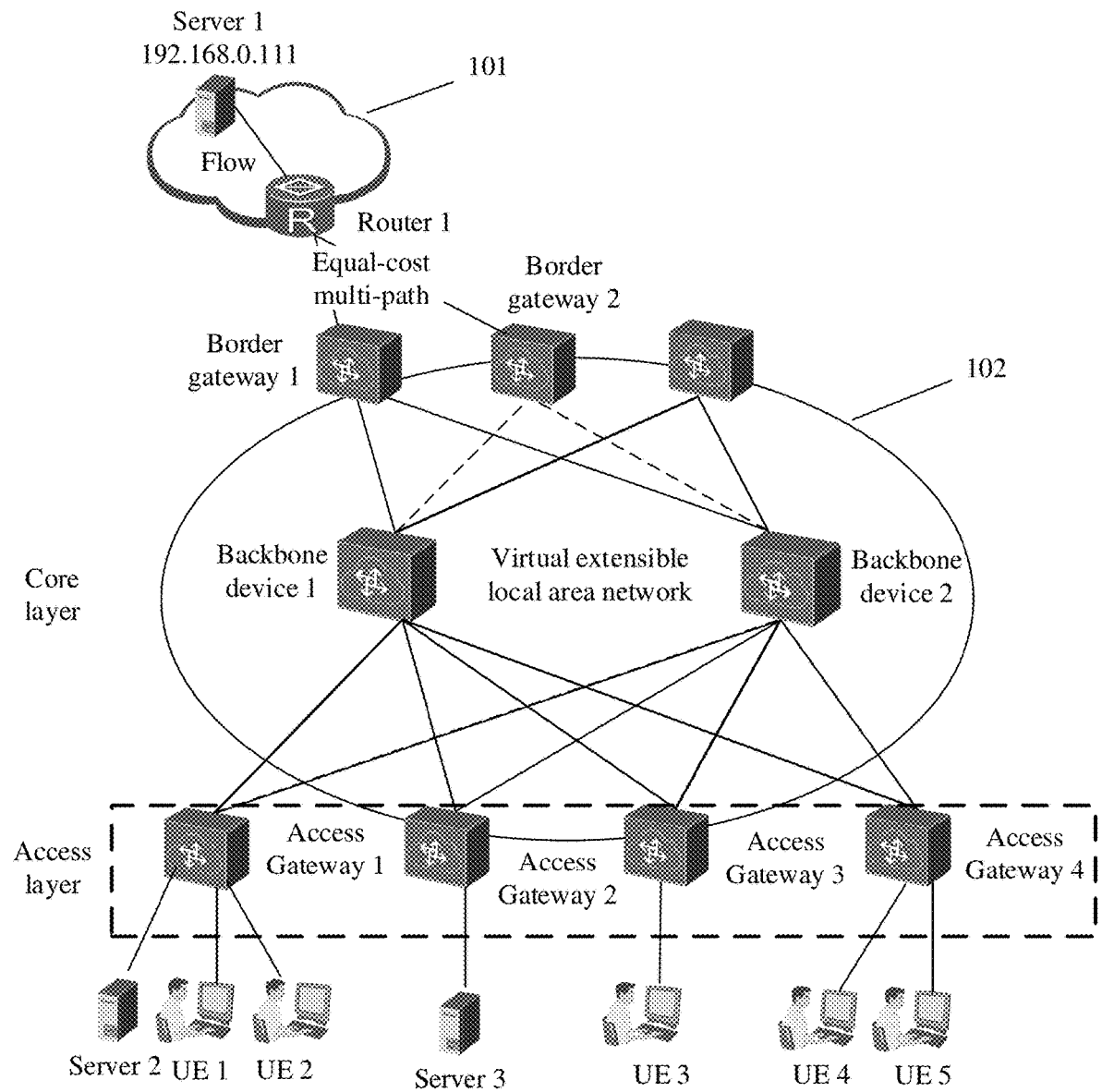
FIG. 1 is a schematic diagram of an application environment of a multicast forwarding entry generation method according to an embodiment of this application.

FIG. 1 is a schematic diagram of an application environment of a multicast forwarding entry generation method according to an embodiment of this application. The application environment in FIG. 1 includes a remote network 101 and a local network 102. The remote network 101 may include a server 1 and a router 1. The local network 102 includes an access layer and a core layer. The access layer of the local network 102 includes a plurality of access devices, also referred to as leaf devices (leaf). The access device connected to a local device is referred to as an access gateway, for example, an access gateway 1, an access gateway 2, an access gateway 3, and an access gateway 4. The access device connected to the remote network 101 is referred to as a border gateway, for example, a border gateway 1 and a border gateway 2. In FIG. 1, the border gateway 1 and the border gateway 2 form equal-cost multi-path for connecting to the remote network 101. The core layer includes a plurality of backbone devices (spine), for example, a backbone device 1 and a backbone device 2. The local device accesses the remote network 101 through the local network 102, to obtain a service provided by the remote network 101. For example, the server 1 in the remote network 101 is a device of a multicast source, and the local device may obtain, through the local network 102, a multicast service provided by the device of the multicast source.

When the local network 102 is a VXLAN network, each access device is configured as a VTEP, and is used to add VXLAN encapsulation to a non-VXLAN packet or decapsulate a VXLAN packet. The backbone device 1 and the backbone device 2 are unaware of a VXLAN tunnel, and are used only as a backbone device for a VXLAN packet. A VXLAN tunnel is established between the access gateways in a manner of Border Gateway Protocol (BGP) Ethernet Virtual Private Network (EVPN), and layer 3 interworking between the local devices connected to different access gateways is implemented by using private-network routes.

In a scenario in which the remote network 101 provides the multicast service, Protocol Independent Multicast (PIM) and Internet Group Management Protocol (IGMP) are enabled between the access gateway and the border gateway, and a BGP multicast virtual private network (MVPN) peer relationship is configured between the access gateways. A same loopback IP address is configured for both the access gateway and the border gateway as a static rendezvous point (RP). The access gateway and the border gateway form an anycast RP in a VXLAN domain by using a same static IP address.

First, the server 1 in the remote network 101 advertises information about the multicast source. The information about the multicast source indicates an address of the multicast source and the multicast service provide by the multicast source. The multicast service includes an identifier of a multicast group. The router 1 encapsulates a PIM register packet based on the information about the multicast source. The router 1 sends the PIM register packet to the border gateway (the border gateway 1 or the border gateway 2). The border gateway notifies the other access devices (including the access gateway and the border gateway) in the VXLAN network of the information about the multicast source by using the BGP protocol. When the local device (for example, UE 1 and UE 2) orders the multicast service, the local device sends an IGMP report to the access gateway of the local device. The access gateway generates information about the multicast group (S, G) based on the IGMP report, where S indicates the address of the multicast source, and G indicates the identifier of the multicast group. Then, the access gateway sends the information about the multicast group (S, G) to the border gateway on a multicast source side by using the BGP protocol. The border gateway then initiates a multicast group join request to the router 1, updates a multicast forwarding information base (MFIB) based on a response message that is returned by the router 1 and that indicates allowing of the access gateway to join the multicast group, and forwards a received multicast flow corresponding to the multicast group to the access gateway.

As shown in FIG. 1, to improve reliability in the VXLAN network, a tenant usually deploys the plurality of border gateways for backup and load balancing, and different VTEP IP addresses are set for the plurality of border gateways, to ensure that a flow can be switched to another border gateway in a timely manner when one border gateway is faulty, to avoid service interruption. Because all the plurality of border gateways may receive a multicast packet sent by the multicast source and forward the multicast packet to the access gateway, one access gateway receives a plurality of copies of a same multicast packet. For example, in a case in which the router 1 is connected to the border gateway 1 and the border gateway 2 in an equal-cost multi-path (ECMP) manner, when the local device orders the multicast group, both the two border gateways can obtain the multicast packet corresponding to the multicast group from the multicast source. As a result, the access gateway receives two copies of the multicast packet.

For another example, in a case in which the router 1 is connected to the border gateway 1 and the border gateway 2 in a non-equal-cost multi-path (non-ECMP) manner, if the multicast source sends the multicast packet initially by using a link between the border gateway 1 and the router 1, when the link between the border gateway 1 and the router 1 becomes faulty or the border gateway 1 becomes faulty, the multicast packet sent by the multicast source through the router 1 can be forwarded to the access gateway only through the border gateway 2. In this case, the access gateway receives only one copy of the multicast packet. When the link between the border gateway 1 and the router 1 recovers or the border gateway 1 recovers, if PIM pruning is not performed in a multicast forwarding information base for the router 1 to the border gateway 2 yet, but a multicast forwarding information base for the router 1 to the border gateway 1 is generated, the access gateway also receives two copies of the multicast packet.

The two copies of the multicast packet are transmitted on the VXLAN network, thereby wasting bandwidth resources of the VXLAN network and a processing capability of the access gateway. Therefore, it is necessary to provide a method to resolve an excess-packet problem in the VXLAN network shown in FIG. 1.

FIG. 2 is a schematic flowchart of a multicast forwarding entry generation method 200 according to an embodiment of this application. The method 200 is applied to a network including an access gateway, a first border gateway, and a second border gateway, where the first border gateway and the second border gateway correspond to a same multicast source. The network is an overlay virtual extensible local area network VXLAN. As shown in FIG. 2, the method 200 may include step 210 to step 250. The following describes the steps in the method 200 in detail. Optionally, the method 200 may be applicable to transmission of an internet protocol version 4 (IPv4) packet in an IPv4 network. Alternatively, the method 200 may be applicable to transmission of an Internet Protocol version 6 (IPv6) packet in an IPv4 network. Alternatively, the method 200 may be applicable to transmission of an IPv4 packet in an IPv6 network. Alternatively, the method 200 may be applicable to transmission of an IPv6 packet in an IPv6 network.

Step 210: The access gateway receives a first multicast packet from the first border gateway, and generates a first multicast forwarding entry based on the first multicast packet, where the first multicast forwarding entry includes an address of the first border gateway and information about the multicast source.

Optionally, the first multicast packet may include two parts: an outer packet and an inner packet. The outer packet may be VXLAN unicast encapsulation or VXLAN multicast encapsulation, and the inner packet is a multicast packet.

Figure 3:
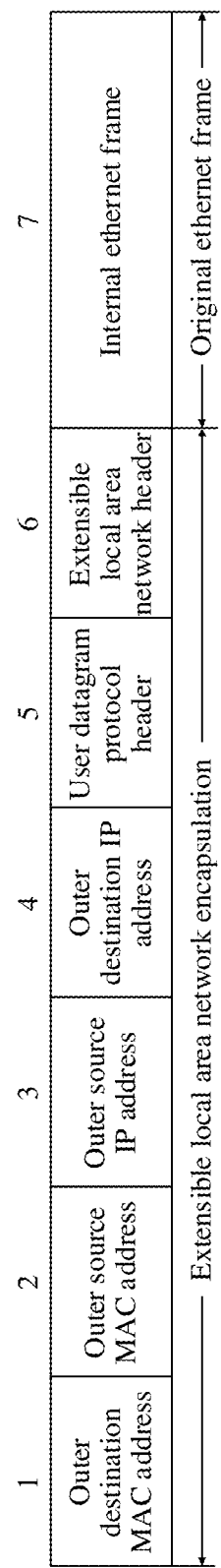
FIG. 3 is a schematic diagram of a format of a multicast packet.

FIG. 3 is a schematic diagram of a format of a multicast packet. The multicast packet includes two parts: a virtual extensible local area network encapsulation (outer) part and an original Ethernet frame (inner) part.

The virtual extensible local area network encapsulation part may include six sub-parts. The six sub-parts are sequentially:

First sub-part: outer destination media access control (MAC) address, that is, multicast MAC address, which may be obtained based on mapping of a multicast group IP address of a VXLAN tunnel.

Second sub-part: outer source MAC address. The outer source MAC address is a MAC address of each-hop routing device.

Third sub-part: outer source IP address, that is, an IP address of a VTEP.

Fourth sub-part: outer destination IP address, that is, an IP address of a multicast source of the VXLAN tunnel.

Fifth sub-part: User Datagram Protocol (UDP) header, which may include: 1: source UDP port number, which is dynamically generated based on hash algorithm; and 2: VXLAN-reserved UDP destination port number, which has a default value of 4789.

Sixth sub-part: virtual extensible local area network header, which may include a virtual extensible local area network identifier (VXLAN Network Identifier, VNI), is represented by 24 bits in a current standard, and supports a maximum of 16 M.

The original Ethernet frame part includes: 1: inner destination MAC address, which is a multicast MAC address, and is obtained based on mapping of a multicast group IP address of the multicast source; 2: inner source MAC address, which may be a MAC address of the multicast source or a MAC address of a VXLAN gateway; 3: inner original-packet source IP address, that is, IP address of the multicast source; and 4: inner original-packet destination IP address, that is, the multicast group IP address.

Optionally, the address of the first border gateway may be a MAC address of the first border gateway, or may be an IP address of a VTEP configured for the first border gateway.

Optionally, the access gateway may determine, based on an inner source MAC address in the first multicast packet, an address of a border gateway through which the first multicast packet passes when being forwarded from the multicast source to the access gateway. In this way, it can be determined that the inner source MAC address in the first multicast packet is the address of the first border gateway. Alternatively, the access gateway may determine, based on an outer VTEP IP address in the first multicast packet, an IP address of a VTEP of a border gateway through which the first multicast packet passes when being forwarded from the multicast source to the access gateway. In this way, it can be determined that the VTEP IP address in the first multicast packet is the address of the first border gateway. As such, the access gateway can determine that the first multicast packet is a multicast packet forwarded by the first border gateway.

Optionally, the information about the multicast source in the first multicast forwarding entry may be understood as an identifier of a multicast group in the first multicast packet and/or an identifier of the multicast source in the first multicast packet. The identifier of the multicast group in the first multicast packet may be used to indicate an address of the multicast group in the first multicast packet. The address of the multicast group in the first multicast packet may be used to indicate an IP address of the multicast group in the first multicast packet or a MAC address of the multicast group in the first multicast packet. The identifier of the multicast source in the first multicast packet may be used to indicate an address of the multicast source in the first multicast packet. The address of the multicast source in the first multicast packet may be used to indicate an IP address of the multicast source in the first multicast packet or a MAC address of the multicast source in the first multicast packet.

Optionally, an inner source IP address in the first multicast packet may be the IP address of the multicast source.

The identifier of the multicast group may be understood as an identifier of a multicast service ordered by a user. The identifier of the multicast source may be understood as an identifier of a device that provides the multicast service ordered by the user. For example, the multicast service may be a CCTV 1 program ordered by the user, and a multicast source that provides the CCTV 1 program ordered by the user may be Central TV Station. For another example, the multicast service may be an SXTV 1 program ordered by the user, and a multicast source that provides the SXTV 1 program ordered by the user may be Shaanxi TV Station.

Optionally, the multicast source of the first multicast packet may be determined by the access gateway based on a multicast source address and a multicast group address in an inner packet in the first multicast packet.

Optionally, the first multicast forwarding entry may further include an inner group IP address in the first multicast packet, an inner source port number in the first multicast packet, a destination port number in the first multicast packet, a virtual extensible local area network identifier VNI in the first multicast packet, or an inner destination media access control MAC address in the first multicast packet.

Step 220: The access gateway receives a second multicast packet from the second border gateway, where the second multicast packet includes an address of the second border gateway and the information about the multicast source, and the first multicast packet and the second multicast packet correspond to the same multicast source.

Optionally, the information about the multicast source included in the second multicast packet may be understood as an identifier of a multicast group in the second multicast packet and/or an identifier of the multicast source in the second multicast packet. The identifier of the multicast group in the second multicast packet may be used to indicate an address of the multicast group in the second multicast packet. The address of the multicast group in the second multicast packet may be used to indicate an IP address of the multicast group in the second multicast packet or a MAC address of the multicast group in the second multicast packet. The identifier of the multicast source in the second multicast packet may be used to indicate an address of the multicast source in the second multicast packet. The address of the multicast source in the second multicast packet may be used to indicate an IP address of the multicast source in the second multicast packet or a MAC address of the multicast source in the second multicast packet. Optionally, an inner source IP address in the second multicast packet may be the IP address of the multicast source.

Optionally, the access gateway may determine, based on an inner source MAC address in the second multicast packet, an address of a border gateway through which the second multicast packet passes when being forwarded from the multicast source to the access gateway. In this way, it can be determined that the inner source MAC address in the second multicast packet is the address of the second border gateway. Alternatively, the access gateway may determine, based on an outer VTEP IP address in the second multicast packet, an IP address of a VTEP of a border gateway through which the second multicast packet passes when being forwarded from the multicast source to the access gateway. In this way, it can be determined that the VTEP IP address in the second multicast packet is the address of the second border gateway. As such, the access gateway can determine that the second multicast packet is a multicast packet forwarded by the second border gateway.

Optionally, that the first multicast packet and the second multicast packet correspond to the same multicast source may be understood as that the same multicast source separately sends the first multicast packet and the second multicast packet to the access gateway, but paths on which the first multicast packet and the second multicast packet are sent from the same multicast source to the access gateway are different. For example, a forwarding path of the first multicast packet may be as follows: the multicast source→the first border gateway→a backbone device→the access gateway, and a forwarding path of the second multicast packet may be as follows: the multicast source→the second border gateway→a backbone device→the access gateway.

Optionally, a moment at which the access gateway receives the second multicast packet may be later than a moment at which the access gateway receives the first multicast packet, or the access gateway may receive the second multicast packet and the first multicast packet at a same moment.

Optionally, the access gateway may receive the second multicast packet after forwarding the first multicast packet, or the access gateway may receive the second multicast packet when the first multicast packet is not forwarded.

Step 230: The access gateway determines a first path to the multicast source through the first border gateway, and a second path to the multicast source through the second border gateway.

Optionally, the first path may be understood as a path through which the multicast source sends the first multicast packet to the access gateway, and the second path may be understood as a path through which the multicast source sends the second multicast packet to the access gateway.

Optionally, the access gateway may also determine, based on the inner source MAC address in the first multicast packet, the address of the border gateway through which the first multicast packet passes when being forwarded from the multicast source to the access gateway. In this way, it can be determined that the inner source MAC address in the first multicast packet is the address of the first border gateway. In other words, the access gateway may determine that the first path is as follows: the multicast source→the first border gateway→the access gateway. The access gateway may determine, based on the inner source MAC address in the second multicast packet, the address of the border gateway through which the second multicast packet passes when being forwarded from the multicast source to the access gateway. In this way, it can be determined that the inner source MAC address in the second multicast packet is the address of the second border gateway. In other words, the access gateway may determine that the second path is as follows: the multicast source→the second border gateway-→the access gateway.

Step 240: The access gateway determines an optimal path to the multicast source based on the first path and the second path.

The access gateway may determine the optimal path to the multicast source based on the first path and the second path in the following two manners.

Manner 1

First, the access gateway obtains the address of the first border gateway and the address of the second border gateway. The address of the first border gateway may be the MAC address of the first border gateway, or may be the IP address of the VTEP of the first border gateway; and the address of the second border gateway may be the MAC address of the second border gateway, or may be the IP address of the VTEP of the second border gateway. The access gateway may obtain the address of the first border gateway based on the inner source MAC address in the first multicast packet, and the access gateway may obtain the address of the second border gateway based on the inner source MAC address in the second multicast packet. Second, the access gateway determines the optimal path by comparing the address of the first border gateway with the address of the second border gateway. The access gateway may determine the border gateway with a smaller address between the first border gateway and the second border gateway as an optimal border gateway, and then determine, as the optimal path, the path to the multicast source through the optimal border gateway. If the address of the first border gateway is less than the address of the second border gateway, the access gateway uses the first border gateway as the optimal border gateway, and determines, as the optimal path, the first path that is to the multicast path through the first border gateway. If the address of the first border gateway is greater than the address of the second border gateway, the access gateway uses the second border gateway as the optimal border gateway, and determines, as the optimal path, the second path that is to the multicast path through the second border gateway.

Manner 2

A first mapping table is stipulated in a communication protocol. The first mapping table includes a priority of a plurality of paths on which the multicast source forwards a multicast packet to the access gateway. The access gateway may obtain a priority of the first path and the second path based on the first path, the second path, and the first mapping table. In addition, the access gateway determines the path with a higher priority between the first path and the second path as the optimal path.

Step 250: The access gateway generates a forwarding entry of the multicast source based on the optimal path.

Optionally, when the first path is the optimal path, the access gateway uses the first multicast forwarding entry as the forwarding entry of the multicast source; or when the second path is the optimal path, the access gateway updates the first multicast forwarding entry based on information about the second border gateway, to obtain a second multicast forwarding entry, and uses the second multicast forwarding entry as the forwarding entry of the multicast source.

The information about the second border gateway is used to indicate the address of the second border gateway. That is, the access gateway updates the first multicast forwarding entry by replacing the address of the first border gateway in the first multicast forwarding entry with the address of the second border gateway, to form the second multicast forwarding entry, and uses the second multicast forwarding entry as the forwarding entry of the multicast source. The second multicast forwarding entry may include the address of the second border gateway and the information about the multicast source.

Optionally, when the first path is the optimal path, the access gateway discards the second multicast packet, and the access gateway sends a notification message to the second border gateway, where the notification message is used to indicate the second border gateway to stop forwarding a multicast packet of the multicast source to the access gateway. When the second path is the optimal path, the access gateway sends a notification message to the first border gateway, where the notification message is used to indicate the first border gateway to stop forwarding a multicast packet of the multicast source to the access gateway. If the access gateway does not forward the first multicast packet at this time, the access gateway discards the first multicast packet.

Optionally, because the first border gateway and the second border gateway correspond to the same multicast source, the inner group IP address in the first multicast packet sent by the multicast source through the first border gateway is the same as an inner group IP address in the second multicast packet sent by the multicast source through the second border gateway; the inner source port number in the first multicast packet sent by the multicast source through the first border gateway is the same as an inner source port number in the second multicast packet sent by the multicast source through the second border gateway; the destination port number in the first multicast packet sent by the multicast source through the first border gateway is the same as a destination port number in the second multicast packet sent by the multicast source through the second border gateway; the virtual extensible local area network identifier VNI in the first multicast packet sent by the multicast source through the first border gateway is the same as a virtual extensible local area network identifier VNI in the second multicast packet sent by the multicast source through the second border gateway; or the inner destination media access control MAC address in the first multicast packet sent by the multicast source through the first border gateway is the same as an inner destination media access control MAC address in the second multicast packet sent by the multicast source through the second border gateway.

Therefore, when the first path is the optimal path, the access gateway discards the second multicast packet and indicates the second border gateway to stop forwarding a multicast packet of the multicast source to the access gateway. In this case, the access gateway performs multicast packet forwarding by using the first multicast forwarding entry as the forwarding entry of the multicast source. When the second path is the optimal path, the access gateway indicates the first border gateway to stop forwarding a multicast packet of the multicast source to the access gateway, updates the first multicast forwarding entry by replacing the address of the first border gateway in the first multicast forwarding entry with the address of the second border gateway, and does not need to change other content in the first multicast forwarding entry, to form the second multicast forwarding entry. In this case, the access gateway performs multicast packet forwarding by using the second multicast forwarding entry as the forwarding entry of the multicast source. The access gateway forwards only a multicast packet that is received through the optimal path. This prevents a multicast user from receiving a plurality of copies of a same multicast packet, and also improves bandwidth resource utilization of the VXLAN network.

Optionally, after generating the forwarding entry of the multicast source based on the optimal path, the access gateway may further perform the following step 1 to step 5.

Step 1: The access gateway receives a multicast packet, where the multicast packet includes the information about the multicast source.

Step 2: The access gateway determines a target multicast index (MCID) based on the forwarding entry of the multicast source.

The forwarding entry of the multicast source further includes an MCID. The MCID corresponds to an inner source MAC address (the MAC address of the multicast source) in the forwarding entry of the multicast source, or corresponds to the IP address of the VTEP corresponding to the optimal path.

Optionally, the forwarding entry of the multicast source may include a correspondence between the MCID and the inner source MAC address (the MAC address of the multicast source) or the IP address of the VTEP corresponding to the optimal path. Alternatively, the forwarding entry of the multicast source may also include a correspondence between an index of the MCID and an index of the inner source MAC address (the MAC address of the multicast source) or an index of the IP address of the VTEP corresponding to the optimal path. In an IPv6 scenario, an IPv6 address (16 bytes) is converted into a comparatively small field index value (for example, may have four bytes), thereby greatly saving resources of a chip forwarding table.

Step 3: The access gateway searches a target private-network multicast forwarding table based on the target MCID, where the target private-network multicast forwarding table includes a correspondence between the target MCID and an egress port.

Step 4: The access gateway obtains, based on the target private-network multicast forwarding table, the egress port corresponding to the target MCID.

Figure 4:
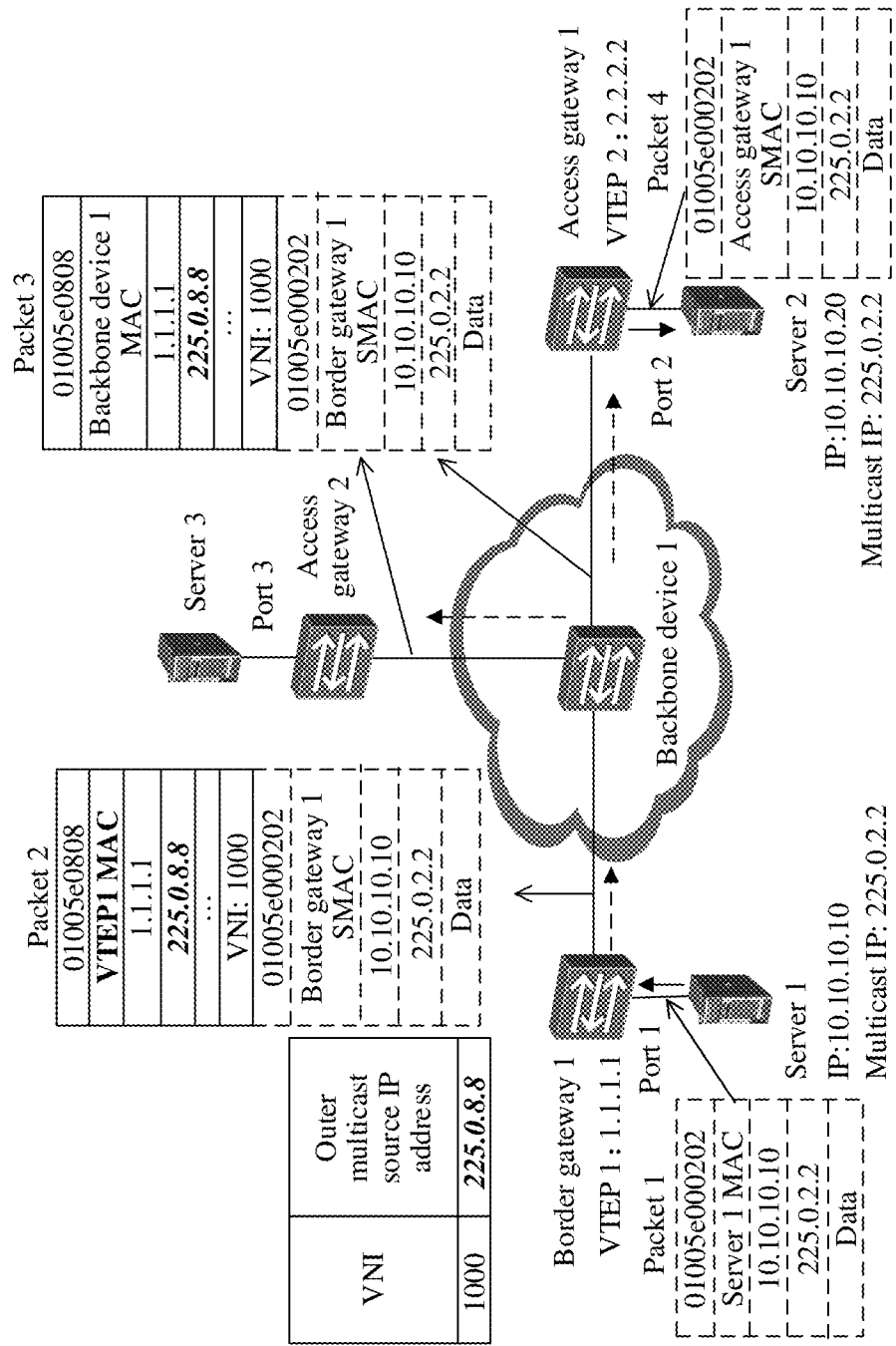
FIG. 4 is a schematic diagram of a format of a packet when the packet is delivered from a multicast source to a multicast user.
Figure 5:
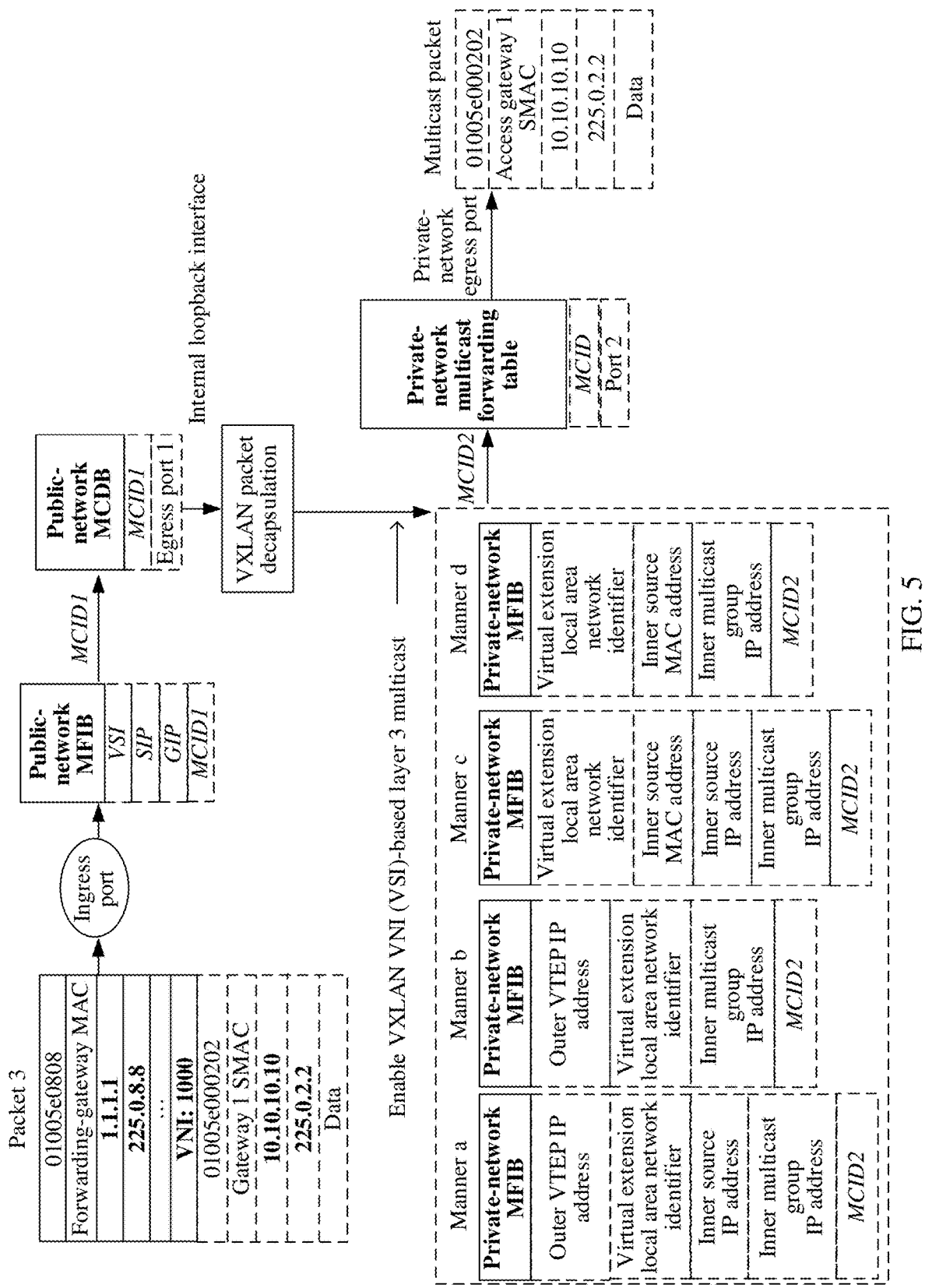
FIG. 5 is a schematic diagram of how an access gateway forwards a multicast packet after receiving the multicast packet.

Step 5: The access gateway forwards the multicast packet to a target multicast terminal device based on the egress port. For example, FIG. 4 is a schematic diagram of a format of a multicast packet (referred to as a packet for short hereinafter) after being processed by different devices when being sent from a multicast source to a multicast user. A server 1 is the multicast source, an IP address of the server 1 is 10.10.10.10, and an inner multicast group IP address is 225.0.2.2. A VNI in the packet when the packet is transmitted on a VXLAN network is 1000, and an outer multicast group IP address is 225.0.8.8. The server 1 sends a packet 1 to a border gateway. In the packet 1, the first layer (0100-5e00-0202) is a MAC address mapped to a VXLAN multicast group, the second layer (server 1 MAC) is a MAC address of the server 1, the third layer (10.10.10.10) is the IP address of the server 1, the fourth layer (225.0.2.2) is the multicast group IP address of the multicast source, and the fifth layer is data transmitted by the packet 1. An IP address of a VETP of the border gateway 1 is 1.1.1.1. After the packet 1 arrives at the border gateway 1, the border gateway 1 needs to search, based on a port 1, the multicast source IP address in the packet 1, and the IP address of the VTEP, a private-network multicast forwarding information base (MFIB) that is in the border gateway 1, copies the packet 1 based on an obtained VXLAN multicast tunnel egress, encapsulates the packet 1, and forwards the encapsulated packet 1 through a tunnel egress port. The packet 1 is the multicast packet, and a packet obtained after the border gateway 1 performs VXLAN encapsulation on the packet 1 is a packet 2. The packet 2 includes two parts: an inner packet (as indicated by a dashed-line part in FIG. 4) and an outer packet (as indicated by a solid-line part in FIG. 4). The packet 2 may be a multicast packet, or may be a unicast packet. A format of the inner packet is similar to a format of the packet 1, except that the second layer in the packet 1 is replaced with a MAC address of the border gateway. In the outer packet, the first layer (0100-5e00-0808) is a MAC address mapped to the VXLAN multicast group, the second layer (VETP 1 MAC) is the MAC address of the border gateway, the third layer (1.1.1.1) is the IP address of the VETP of the border gateway, and the fourth layer (225.0.8.8) is the multicast group IP address. The VNI is added to the outer packet. After receiving the packet 2, a backbone device 1 searches, based on a layer 3 ingress port, the multicast source IP address, and the multicast group IP address of the multicast source, a public-network MFIB that is in the backbone device 1, and forwards the packet 2 through a multicast egress port, that is, forwards the packet 2 to an access gateway 1 and an access gateway 2 that are connected to the backbone device 1. When forwarding the packet 2, the backbone device 1 replaces the second layer in the outer packet in the packet 2 with a MAC address of the backbone device 1, to form a packet 3. The packet 3 may be a multicast packet, or may be a unicast packet. FIG. 5 is a schematic diagram of an operation performed by the access gateway 1 when receiving the packet 3. When receiving the packet 3, the access gateway 1 determines validity of the VXLAN multicast packet 3. The access gateway 1 searches, based on the outer multicast source IP address and the outer VETP IP address in the packet 3, a public-network MFIB that is in the access gateway 1, to find an MCID 1 corresponding to an outer packet in the packet 3; searches a public-network MCDB based on the MCID 1, to find an egress port 1 corresponding to the MCID 1; then searches a VXLAN tunnel decapsulation table after performing internal loopback; decapsulates the VXLAN multicast packet 3, to obtain an inner multicast packet (as indicated by a dashed-line part in the packet 3 in FIG. 4); searches a private-network MFIB in a manner a (outer VETP IP address, virtual extensible local area network identifier, inner source IP address, and inner multicast group IP address), a manner b (outer VETP IP address, virtual extensible local area network identifier, and inner multicast group IP address), a manner c (virtual extensible local area network identifier, inner source MAC address, inner source IP address, and inner multicast group IP address), or a manner d (virtual extensible local area network identifier, inner source MAC address, and inner multicast group IP address) in FIG. 5, to find an MCID 2 corresponding to the inner multicast packet in the packet 3; searches a private-network multicast forwarding information base based on the MCID 2, to find an egress port 2 corresponding to the MCID 2; replaces the second layer in the inner multicast packet in the packet 3 with a MAC address of the access gateway 1, to form a packet 4, where the packet 4 is a multicast packet; and forwards the packet 4 to the corresponding multicast user through the egress port 2.

FIG. 4 uses a multicast packet as an example to describe a process in which different devices in this embodiment of this application process a packet. The foregoing method provided in this embodiment of this application may be further used for processing an unknown unicast or broadcast packet.

Optionally, a network to which this embodiment of this application is applied may include a plurality of border gateways. The plurality of border gateways may correspond to a same multicast source, or may correspond to different multicast sources. The first border gateway and the second border gateway are any of a plurality of border gateways that correspond to a same multicast source. When another border gateway that is in the network and that corresponds to the same multicast source as the first border gateway and/or the second border gateway sends a multicast packet to the access gateway, the method 200 is also applicable. Details are not described herein again.

It should be understood that sequence numbers of the foregoing processes do not mean an execution sequence in the embodiments of this application. The execution sequence of the processes should be determined based on functions and internal logic of the processes, and should not be construed as any limitation on the implementation processes of the embodiments of this application.

The foregoing describes in detail the processes of generating a multicast forwarding entry and using a multicast forwarding entry in the embodiments of this application with reference to FIG. 2 to FIG. 5. The following describes in detail gateways in the embodiments of this application with reference to FIG. 6 and FIG. 7.

Figure 6:
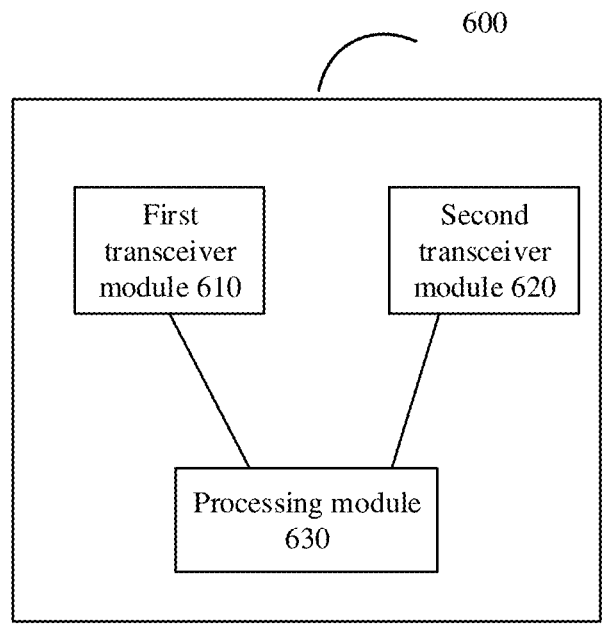
FIG. 6 is a schematic block diagram of an access gateway according to an embodiment of this application.

FIG. 6 is a schematic diagram of an access gateway 600 according to an embodiment of this application. A network in which the access gateway is located further includes a first border gateway and a second border gateway, where the first border gateway and the second border gateway correspond to a same multicast source. The access gateway 600 may be applied to a network architecture shown in FIG. 1. For example, in the network architecture shown in FIG. 1, the access gateway 600 may be an access gateway 1, the first border gateway may be a border gateway 1, and the second border gateway may be a border gateway 2. As shown in FIG. 6, the access gateway 700 may include a first transceiver module 610, a second transceiver module 620, and a processing module 630.

The first transceiver module 610 is configured to receive a first multicast packet from the first border gateway. The processing module 630 is configured to generate a first multicast forwarding entry based on the first multicast packet, where the first multicast forwarding entry includes an address of the first border gateway and information about the multicast source.

The second transceiver module 620 is configured to receive a second multicast packet from the second border gateway, where the second multicast packet includes an address of the second border gateway and information about the multicast source. The second multicast packet and the first multicast packet correspond to a same multicast source.

The processing module 630 is further configured to: determine a first path to the multicast source through the first border gateway, determine a second path to the multicast source through the second border gateway, determine an optimal path to the multicast source based on the first path and the second path, and generate a forwarding entry of the multicast source based on the optimal path.

Optionally, the processing module 630 is further configured to: when the first path is the optimal path, use the first multicast forwarding entry as the forwarding entry of the multicast source; or when the second path is the optimal path, update the first multicast forwarding entry based on information about the second border gateway, to obtain a second multicast forwarding entry, and use the second multicast forwarding entry as the forwarding entry of the multicast source, where the second multicast forwarding entry includes the address of the second border gateway and the information about the multicast source.

Optionally, when the first path is the optimal path, the processing module 630 further discards the second multicast packet; the second transceiver module 620 is further configured to send a notification message to the second border gateway, where the notification message is used to notify the second border gateway to stop forwarding the multicast packet of the multicast source to the access gateway.

Optionally, when the second path is the optimal path, the first transceiver module 610 further sends a notification message to the first border gateway, where the notification message is used to notify the first border gateway to stop forwarding the multicast packet of the multicast source to the access gateway.

Optionally, the processing module 630 further obtains an address of the first border gateway and an address of the second border gateway, and determines the optimal path by comparing the address of the first border gateway with the address of the second border gateway.

Further, the access gateway 600 may further include a storage module 730. The storage module 730 is configured to store instructions executed by the first transceiver module 610, the second transceiver module 620, and the processing module 630. The first transceiver module 610, the second transceiver module 620, the processing module 630, and the storage module 730 are coupled to each other.

Figure 7:
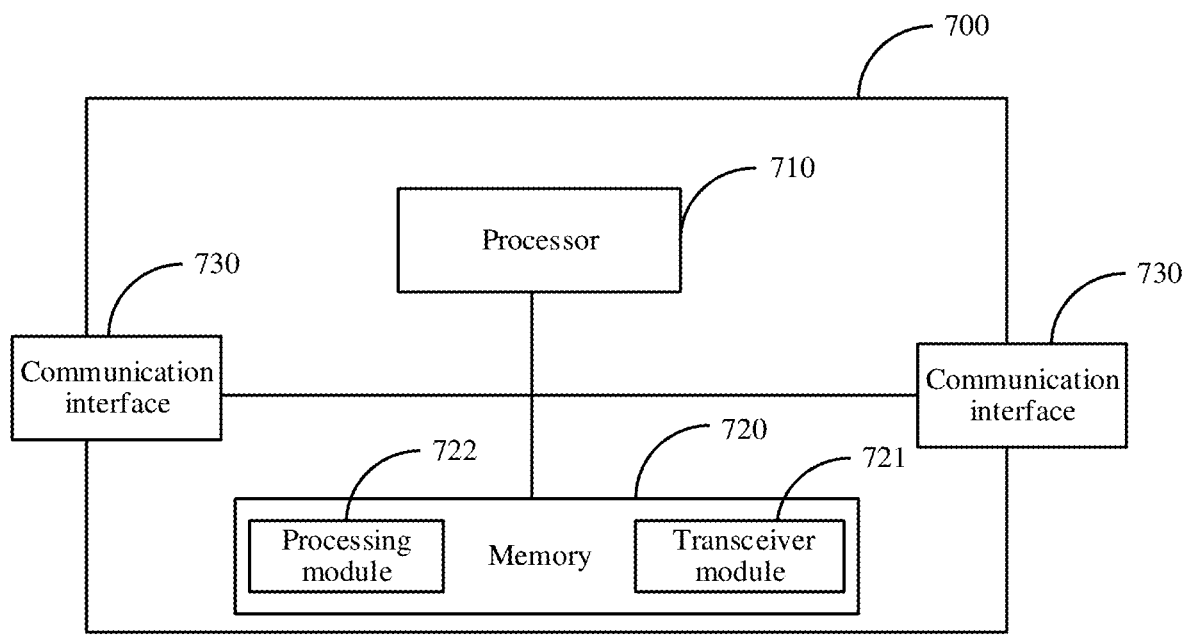
FIG. 7 is a schematic block diagram of an access gateway according to another embodiment of this application.

FIG. 7 is a schematic diagram of another access gateway 700 according to this application. A network in which the access gateway is located further includes a first border gateway and a second border gateway, where the first border gateway and the second border gateway correspond to a same multicast source. The access gateway 700 may be applied to a network architecture shown in FIG. 1. For example, in the network architecture shown in FIG. 1, the access gateway 700 may be an access gateway 1, the first border gateway may be a border gateway 1, and the second border gateway may be a border gateway 2. The access gateway 700 is configured to perform an operation that is performed by an access gateway in the method 200. As shown in FIG. 7, the access gateway 700 may include a processor 710, a memory 720 coupled to the processor 710, and at least one communication interface 730. The processor 710 may be a central processing unit (CPU), a network processor (NP), or a combination of a CPU and an NP. The processor 710 may further be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 710 may further include a combination of the foregoing types of processors. The processor 710 may be one processor, or may include a plurality of processors. The memory 720 may include a volatile memory, for example, a random access memory (RAM); the memory may also include a non-volatile memory, for example, a read-only memory (ROM), a flash memory, a hard disk drive (HDD), or a solid-state drive (SSD); and the memory may further include a combination of the foregoing types of memories. The memory 720 may be one memory, or may include a plurality of memories. In an implementation, the memory 720 stores computer-readable instructions, where the computer-readable instructions may include a plurality of software modules, for example, a transceiver module 721 and a processing module 722. After executing each software module, the processor 710 may perform a corresponding operation according to an indication of each software module. In this embodiment, an operation performed by a software module is actually an operation performed by the processor 710 according to an indication of the software module. After executing the computer-readable instructions in the memory 720, the processor 710 may perform, according to indications of the computer-readable instructions, all operations that may be performed by the access gateway. Operations performed by the access gateway in the embodiment corresponding to FIG. 2 are an example.

The access gateway provided in this application may be a network device such as a router or a switch, or may be a line card or a chip that implements related functions in the foregoing method embodiments. This is not specifically limited in this application. The processor and the memory in the access gateway may be decoupled, be separately disposed on different physical devices, and be connected in a wired or wireless manner to implement respective functions of the processor and the memory, to support the system in implementing various functions in the foregoing embodiments. Alternatively, the processor and the memory may be coupled to a same device.

An embodiment of this application further provides a network system, including the access gateway in the embodiment corresponding to FIG. 6 or FIG. 7, where the network system is used to perform the method 200 in the embodiment corresponding to FIG. 2. All or some of the foregoing embodiments may be implemented by using software, hardware, firmware, or any combination thereof. The terms "system" and "network" may be used interchangeably in this specification. The term "and/or" in this specification describes only an association relationship for describing associated objects and represents that there may be three relationships. For example, A and/or B may represent the following three cases: Only A exists, both A and B exist, and only B exists. In addition, the character "/" in this specification generally indicates an "or" relationship between the associated objects.

Names may be assigned to various objects that may appear in this application, for example, various messages/information/gateways/systems/operations/processes. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, the person may refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, the parts may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The foregoing storage medium includes: any medium that can store program code, such as a USB flash drive, a removable hard disk, a ROM, a RAM, a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multicast forwarding entry generation method, comprising:

receiving, by an access gateway, a first multicast packet from a first border gateway;

generating, by the access gateway, a first multicast forwarding entry based on the first multicast packet, wherein the first multicast forwarding entry comprises an address of the first border gateway and information about a multicast source;

receiving, by the access gateway, a second multicast packet from a second border gateway, wherein the second multicast packet comprises an address of the second border gateway and the information about the multicast source;

determining, by the access gateway, a first path to the multicast source through the first border gateway and a second path to the multicast source through the second border gateway;

determining, by the access gateway, an optimal path to the multicast source based on the first path and the second path;

generating, by the access gateway, a forwarding entry of the multicast source based on the optimal path, wherein in response to determining the first multicast forwarding entry is the optimal path, the first multicast forwarding entry is used as the forwarding entry of the multicast source, and in response to determining the second path is the optimal path, a second multicast forwarding entry is obtained to be used as the forwarding entry of the multicast source;

in response to determining the first path is the optimal path, sending, by the access gateway, a first notification message to the second border gateway, wherein the first notification message is used to notify the second border gateway to stop forwarding the multicast packet of the multicast source to the access gateway; and in response to determining the second path is the optimal path, sending, by the access gateway, a second notification message to the first border gateway, wherein the second notification message is used to notify the first border gateway to stop forwarding the multicast packet of the multicast source to the access gateway.

2. The method according to claim 1, further comprising:
in response to determining the second path is the optimal path, updating the first multicast forwarding entry based on information about the second border gateway to obtain the second multicast forwarding entry, and using the second multicast forwarding entry as the forwarding entry of the multicast source, wherein the second multicast forwarding entry comprises the address of the second border gateway and the information about the multicast source.

3. The method according to claim 1, further comprising:
in response to determining the first path is the optimal path, discarding, by the access gateway, the second multicast packet.

4. The method according to claim 1, wherein the determining, by the access gateway, the optimal path to the multicast source based on the first path and the second path comprises:
obtaining, by the access gateway, the address of the first border gateway and the address of the second border gateway; and
determining, by the access gateway, the optimal path by comparing the address of the first border gateway with the address of the second border gateway.

5. The method according to claim 1, wherein the determining, by the access gateway, the optimal path to the multicast source based on the first path and the second path comprises:
obtaining, by the access gateway, a priority of the first path and a priority of the second path; and
determining, by the access gateway, the optimal path by comparing the priority of the first path with the priority of the second path.

6. The method according to claim 1, wherein the second multicast packet and the first multicast packet correspond to the same multicast source.

7. The method according to claim 1, wherein the first border gateway and the second border gateway are deployed in a virtual extensible local area network.

8. An access gateway, comprising:
a first transceiver, configured to receive a first multicast packet from a first border gateway;
a processor, configured to generate a first multicast forwarding entry based on the first multicast packet, wherein the first multicast forwarding entry comprises an address of the first border gateway and information about a multicast source; and
a second transceiver, configured to receive a second multicast packet from a second border gateway, wherein the second multicast packet comprises an address of the second border gateway and the information about the multicast source,
wherein the processor is further configured to:
determine a first path to the multicast source through the first border gateway and a second path to the multicast source through the second border gateway;
determine an optimal path to the multicast source based on the first path and the second path;
generate a forwarding entry of the multicast source based on the optimal path, wherein in response to determining the first multicast forwarding entry is the optimal path, the first multicast forwarding entry is used as the forwarding entry of the multicast source, and in response to determining the second path is the optimal path, a second multicast forwarding entry is obtained to be used as the forwarding entry of the multicast source;
in response to determining the first path is the optimal path, send a first notification message to the second border gateway, wherein the first notification message is used to notify the second border gateway to stop forwarding the multicast packet of the multicast source to the access gateway; and
in response to determining the second path is the optimal path, send a second notification message to the first border gateway, wherein the second notification message is used to notify the first border gateway to stop forwarding the multicast packet of the multicast source to the access gateway.

9. The access gateway according to claim 8, wherein the processor is further configured to:
in response to determining the second path is the optimal path, update the first multicast forwarding entry based on information about the second border gateway to obtain the second multicast forwarding entry, and use the second multicast forwarding entry as the forwarding entry of the multicast source, wherein the second multicast forwarding entry comprises the address of second border gateway and the information about the multicast source.

10. The access gateway according to claim 8, wherein the processor is configured to:
in response to determining the first path is the optimal path, discard the second multicast packet.

11. The access gateway according to claim 8, wherein the processor is further configured to:
obtain the address of the first border gateway and the address of the second border gateway; and
determine the optimal path by comparing the address of the first border gateway with the address of the second border gateway.

12. The access gateway according to claim 8, wherein the processor is further configured to:
obtain a priority of the first path and a priority of the second path; and
determine the optimal path by comparing the priority of the first path with the priority of the second path.

13. The access gateway according to claim 8, wherein the second multicast packet and the first multicast packet correspond to the same multicast source.

14. The access gateway according to claim 8, wherein the first border gateway and the second border gateway are deployed in a virtual extensible local area network.

15. A network system, comprising:
an access gateway;
a first border gateway; and
a second border gateway, wherein the first border gateway and the second border gateway correspond to a multicast source, and the access gateway is configured to:
receive a first multicast packet from the first border gateway;
generate a first multicast forwarding entry based on the first multicast packet, wherein the first multicast forwarding entry comprises an address of the first border gateway and information about the multicast source;

receive a second multicast packet from the second border gateway, wherein the second multicast packet comprises an address of the second border gateway and the information about the multicast source;

determine a first path to the multicast source through the first border gateway and a second path to the multicast source through the second border gateway;

determine an optimal path to the multicast source based on the first path and the second path;

generate a forwarding entry of the multicast source based on the optimal path, wherein in response to determining the first multicast forwarding entry is the optimal path, the first multicast forwarding entry is used as the forwarding entry of the multicast source, and in response to determining the second path is the optimal path, a second multicast forwarding entry is obtained to be used as the forwarding entry of the multicast source;

in response to determining the first path is the optimal path, send a first notification message to the second border gateway, wherein the first notification message is used to notify the second border gateway to stop forwarding the multicast packet of the multicast source to the access gateway; and in response to determining the second path is the optimal path, send a second notification message to the first border gateway, wherein the second notification message is used to notify the first border gateway to stop forwarding the multicast packet of the multicast source to the access gateway.

16. The system according to claim 15, wherein the access gateway is further configured to:

in response to determining the second path is the optimal path, update the first multicast forwarding entry based on information about the second border gateway to obtain the second multicast forwarding entry, and use the second multicast forwarding entry as the forwarding entry of the multicast source, wherein the second multicast forwarding entry comprises the address of second border gateway and the information about the multicast source.

17. The system according to claim 15, wherein the access gateway is further configured to:

in response to determining the first path is the optimal path, discard the second multicast packet.

18. The system according to claim 15, wherein the access gateway is configured to:

obtain the address of the first border gateway and the address of the second border gateway; and determine the optimal path by comparing the address of the first border gateway with the address of the second border gateway.

19. The system according to claim 15, wherein the access gateway is configured to:

obtain a priority of the first path and a priority of the second path; and determine the optimal path by comparing the priority of the first path with the priority of the second path.

20. The system according to claim 15, wherein the second multicast packet and the first multicast packet correspond to the same multicast source.

* * * * *